US008644163B2

(12) United States Patent  (10) Patent No.: US 8,644,163 B2
Huang et al.  (45) Date of Patent: Feb. 4, 2014

(54) SYSTEM WITH WIRELESS NETWORK DEVICE AND METHOD FOR PROCESSING WIRELESS NETWORK PROFILE

(75) Inventors: Wei-Cheng Huang, New Taipei (TW); Mei-Yi Tsai, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 15 days.

(21) Appl. No.: 13/241,162

(22) Filed: Sep. 22, 2011

(65) Prior Publication Data

US 2012/0014323 A1  Jan. 19, 2012

Related U.S. Application Data

(63) Continuation-in-part of application No. 12/731,150, filed on Mar. 25, 2010.

(30) Foreign Application Priority Data

Jun. 24, 2011 (TW) .............................. 100122286 A (51) Int. Cl.
 *G01R 31/08* (2006.01)
(52) U.S. Cl.
 USPC ........................................................ 370/238
(58) Field of Classification Search
 None
 See application file for complete search history.

(56) References Cited

U.S. PATENT DOCUMENTS

| 6,963,358 | B2 | 11/2005 | Cohen et al. |
| 2006/0215622 | A1 | 9/2006 | Abdel-Kader et al. |
| 2007/0237093 | A1 | 10/2007 | Rajagopalan |
| 2008/0052384 | A1 | 2/2008 | Marl et al. |
| 2008/0232299 | A1 | 9/2008 | Mosig |
| 2009/0022117 | A1 | 1/2009 | Quigley et al. |
| 2009/0185792 | A1 | 7/2009 | Braunstein et al. |
| 2010/0167697 | A1 | 7/2010 | Ishikawa et al. |
| 2010/0227610 | A1 | 9/2010 | Jabara et al. |
| 2010/0297943 | A1* | 11/2010 | Kaplan et al. ............... 455/41.2 |
| 2011/0096168 | A1 | 4/2011 | Siann et al. |
| 2011/0134846 | A1 | 6/2011 | Abdel-Kader et al. |

FOREIGN PATENT DOCUMENTS

| CN | 1815408 A | 8/2006 |
| CN | 101175004 A | 5/2008 |
| CN | 101448140 A | 6/2009 |
| CN | 201378849 Y | 1/2010 |
| DE | 102006018092 A1 | 10/2007 |
| DE | 102006043667 A1 | 3/2008 |
| TW | 200610361 | 3/2006 |
| TW | 200830781 | 7/2008 |
| TW | 200913674 | 3/2009 |
| TW | 200922344 | 5/2009 |
| TW | M364224 | 9/2009 |
| TW | M366948 | 10/2009 |

* cited by examiner

*Primary Examiner* — William C Vaughn, Jr.
*Assistant Examiner* — Daniel Tekle
(74) *Attorney, Agent, or Firm* — CKC & Partners Co., Ltd.

(57) ABSTRACT

A system with a wireless network device is provided. The system includes a wireless network device and an electrical device. A storage unit of the electrical device stores a wireless network profile. A second processing unit of the electrical device detects if the wireless network device is connected to the electrical device. When the wireless network device is connected to the electrical device, the second processing unit of the electrical device transmits the wireless network profile to the wireless network device. When the wireless network device obtains the wireless network profile, a first processing unit of the wireless network device drives a first wireless network unit of the wireless network device to transmit data wirelessly according to the wireless network profile. A method for processing a wireless network profile is also disclosed.

11 Claims, 4 Drawing Sheets

SYSTEM WITH WIRELESS NETWORK DEVICE AND METHOD FOR PROCESSING WIRELESS NETWORK PROFILE

RELATED APPLICATIONS

The present application is a Continuation-in-part of U.S. application Ser. No. 12/731,150, filed on Mar. 25, 2010, and also claims the benefit of Taiwan Patent Application Serial Number 100122286, filed on Jun. 24, 2011, the disclosures of both of which are hereby incorporated by reference herein in their entirely.

BACKGROUND

1. Technical Field

The present invention relates to a system with a network device and a method for processing a network profile. More particularly, the present invention relates to a system with a wireless network device and a method for processing a wireless network profile.

2. Description of Related Art

Wireless network refers to any type of computer network that is wireless, and is commonly associated with a telecommunications network whose interconnections between nodes is implemented without the use of wires. Wireless telecommunications networks are generally implemented with some type of remote information transmission system that uses electromagnetic waves, such as radio waves, for the carrier and this implementation usually takes place at the physical level or "layer" of the network.

Since network service can be obtained, through wireless network without a network cable connected, wireless network service becomes more and more popular. In addition, as transmission rate of wireless network develops, more and more devices, such as computers, Personal Digital Assistants (PDAs), Digital Photo Frame (DPF), apply wireless network for network connection. Therefore, there is a trend to transmit data through wireless network.

SUMMARY

According to one embodiment of this invention, a system with a portable Wi-Fi digital video camcorder is provided. The portable Wi-Fi digital video camcorder includes a battery, a wireless network unit, a liquid crystal display (LCD) unit, a video-stream capturing unit and a processing unit. The battery supplies power to the portable Wi-Fi digital video camcorder. The video-stream capturing unit captures a present video stream. The processing unit is electrically connected with the wireless network unit, the LCD unit and the video-stream capturing unit. The processing unit includes an LCD driving module and a video-stream transmitting module. The LCD driving module drives the LCD unit. The video-stream transmitting module utilizes the wireless network unit to transmit the present video stream.

According to another embodiment of this invention, a portable Wi-Fi digital video camcorder includes a battery, a wireless network unit, an LCD unit, a video-stream capturing unit and a processing unit. The battery supplies power to the portable Wi-Fi digital video camcorder. The video-stream capturing unit captures a present video stream. The processing unit is electrically connected with the wireless network unit, the LCD unit and the video-stream capturing unit. The processing unit includes an LCD driving module and a video-stream transmitting module. The LCD driving module drives the LCD unit. The video-stream transmitting module utilizes the wireless network unit to transmit the present video stream.

According to another embodiment of this invention, a system with portable Wi-Fi digital video camcorder includes a portable Wi-Fi digital video camcorder and a wireless network device. The portable Wi-Fi digital video camcorder includes a battery, a first wireless network unit, a LCD unit, a video-stream capturing unit and a first processing unit. The first processing unit is electrically connected with the first wireless network unit, the LCD unit and the video-stream capturing unit. The battery supplies power to the portable Wi-Fi digital video camcorder. The video-stream capturing unit captures a present video stream. The first processing unit includes an LCD driving module, a video-stream transmitting module. The LCD driving module drives the LCD unit. The video-stream transmitting module utilizes the first wireless network unit to transmit the present video stream. The wireless network device includes a second wireless network unit an Internet accessing unit a display unit a second processing unit. The second processing unit is electrically connected with the second wireless network unit, the Internet accessing unit and the display unit. The second processing unit includes an instant message (IM) module. The IM module utilizes an IM application to transmit the present video stream, which is received from the portable Wi-Fi digital video camcorder utilizing the second wireless network unit, through Internet with the Internet accessing unit. The IM module utilizes the IM application to receive a remote video stream and drives the display unit to display the remote video stream through Internet with the Internet accessing unit.

According to another embodiment of this invention, a system with a wireless network device is provided. In the system, when a wireless network device is connected to an electrical device through a data transmission interface, the electrical device transmits a network profile thereof that is stored in the electrical device to the wireless network device, and the wireless network device transmits data wirelessly according to the received network profile. The system includes a wireless network device and an electrical device. The wireless network device includes a first data transmission unit, a first wireless network unit and a first processing unit. The first processing unit is electrically connected to the first data transmission unit and the first wireless network unit. The first processing unit includes a profile obtaining module. The electrical device includes a second data transmission unit, a storage unit and a second processing unit. The second processing unit is electrically connected to the second data transmission unit and the storage unit. The storage unit stores a wireless network profile. The second processing unit includes a detecting module and a profile transmitting module. The detecting module detects if the first data transmission unit of the wireless network device is connected to the second data transmission unit of the electrical device. When the first data transmission unit of the wireless network device is connected to the second data transmission unit of the electrical device, the profile transmitting module transmits the wireless network profile stored in the electrical device through the second data transmission unit to the first data transmission unit of the wireless network device. The first processing unit drives the first wireless network unit to transmit data wirelessly according to the wireless network profile when the profile obtaining module obtains the wireless network profile through the first data transmission unit.

According to another embodiment of this invention, a method for processing a wireless network profile is provided. In the method, when a wireless network device is connected to an electrical device through a data transmission interface, the electrical device transmits a network profile thereof that is stored in the electrical device to the wireless network device, and the wireless network device transmits data wirelessly according to the received network profile. In the method, detecting is performed to determine if there is a wireless network device connected to an electrical device through a data transmission interface. A wireless network profile is stored in the electrical device. When the wireless network device is connected to the electrical device through the data transmission interface, the electrical device transmits the wireless network profile to the detected wireless network device. The wireless network device transmits data wirelessly according to the wireless network profile.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawing as follows.

DETAILED DESCRIPTION

Reference will now be made in detail to the present embodiments of the invention, examples of which are illustrated in the accompanying drawing. Wherever possible, the same reference numbers are used in the drawing and the description to refer to the same or like parts.

Figure 1:
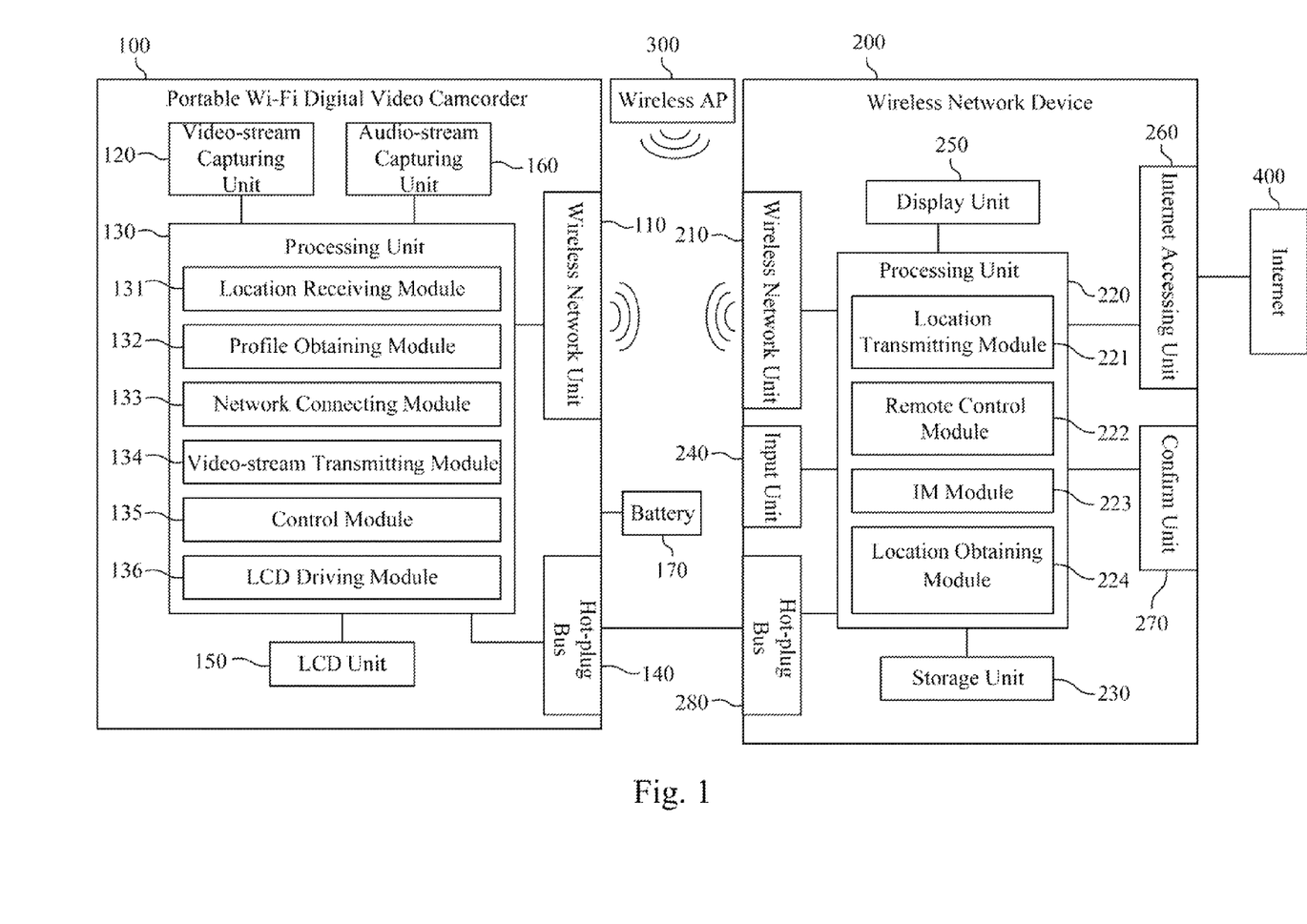
FIG. 1 is a block diagram of a system with a portable Wi-Fi digital video camcorder according to one embodiment of this invention.

FIG. 1 is a block diagram of a system with a portable Wi-Fi digital video camcorder according to one embodiment of this invention. The portable Wi-Fi digital video camcorder transmits a video stream through wireless network.

The system includes a portable Wi-Fi digital video camcorder 100. The portable Wi-Fi digital video camcorder 100 includes a wireless network unit 110, a video-stream capturing unit 120, a processing unit 130, an LCD unit 150 and a battery 170. The processing unit 130 is electrically connected with the wireless network unit 110, the video-stream capturing unit 120 and the LCD unit 150.

The battery 170 supplies power to the portable Wi-Fi digital video camcorder 100. The video-stream capturing unit 120 captures a present video stream. The processing unit 130 includes a video-stream transmitting module 134 and an LCD driving module 136. The video-stream transmitting module 134 utilizes the wireless network unit 110 to transmit the present video stream captured by the video-stream capturing unit 120. The LCD driving module 136 drives the LCD unit 150.

The wireless network unit 110 may transmit the present video stream captured by the video-stream capturing unit 120 to other wireless network device utilizing Ad-hoc network mode of Wi-Fi network. In addition, the wireless network unit 110 may transmit the present video stream through a wireless access point (AP). Therefore, the system may include a wireless AP 300, and the processing unit 130 may include a network connecting module 133. The network connecting module 133 may utilize the wireless network unit 110 to build connection with the wireless AP 300 according to a wireless AP profile. The wireless AP 300 may follow Wi-Fi standards. Therefore, Wi-Fi instructions may be utilized to transmit data between the portable Wi-Fi digital video camcorder 100 and the wireless AP 300.

The portable Wi-Fi digital video camcorder 100 may obtain the wireless AP profile, which is utilized for building connection with the wireless AP 300, from other wireless network devices. Therefore, the system may include a wireless network device 200. The wireless network device 200 may be a computer, a PDA, a DPF, a mobile phone or other electrical devices supporting wireless network. The wireless network device 200 includes a wireless network unit 210 and a processing unit 220, which are electrically connected with each other.

The processing unit 220 includes a location transmitting module 221. The location transmitting module 221 utilizes the wireless network unit 210 to build connection with the portable Wi-Fi digital video camcorder 100. Wherein, the location transmitting module 221 may keep receiving a wireless network device ID and determine if the received wireless network device ID is the device ID of the portable Wi-Fi digital video camcorder 100. If the received wireless network device ID is the device ID of the portable Wi-Fi digital video camcorder 100, the device transmitting the wireless network device ID thereof is taken as the portable Wi-Fi digital video camcorder 100. Hence, the device ID of the portable Wi-Fi digital video camcorder 100 may be set to a specified ID for determination thereof.

After the portable Wi-Fi digital video camcorder 100 is sensed, the location transmitting module 221 utilizes the wireless network unit 210 to transmit a storage location, at which the wireless AP profile is stored, to the wireless network unit 110. The wireless AP profile may include an AP Identifier (ID) of the wireless AP 300, an encryption method utilized by the wireless AP 300, a key to the encryption method utilized by the wireless AP 300, or any other information related to the wireless AP 300. Wherein, a Service Set Identifier (SSID) of the wireless AP 300 may be utilized as the AP ID of the wireless AP 300. The encryption method utilized by the wireless AP 300 may be Wired Equivalent Privacy (WEP), WiFi Protected Access (WPA), WPA2 or any other encryption method. In addition, Ad-hoc network mode of Wi-Fi can be utilized to build connection between the wireless network unit 110 of the portable Wi-Fi digital video camcorder 100 and the wireless network unit 210 of the wireless network device 200 and transmit the wireless AP profile.

In another embodiment, the wireless network device 200 may include a confirm unit 270 electrically connected with the processing unit 220. The confirm unit 270 generates a confirm signal to the processing unit 220 after operated. The location transmitting module 221 utilizes the wireless network unit 210 to transmit the storage location to the portable Wi-Fi digital video camcorder 100 after the confirm signal is received. The confirm unit 270 may be a button, a key or any other component which can be utilized to generate the confirm signal. Therefore, users may operate the confirm unit 270 to trigger the confirm unit 270 to generate the confirm signal and make the wireless network device 200 start to transmit the storage location.

The processing unit 130 of the portable Wi-Fi digital video camcorder 100 may include a location receiving module 131 and a profile obtaining module 132. The location receiving module 131 receives the storage location, at which the wireless AP profile is stored. Wherein, the location receiving module 131 may receive the storage location utilizing the wireless network unit 110. In another embodiment, the location receiving module 131 may receive the storage location through an input unit, such as a button, a keyboard or any other input unit. In still another embodiment, the location receiving module 131 may receive the storage location through a software-implemented user interface. The profile obtaining module 132 obtains the wireless AP profile from the storage location. Therefore, users don't need to input the wireless AP profile for the portable Wi-Fi digital video camcorder 100, which is complicated and annoyed for users.

The wireless network device 200 may provide its wireless AP profile to the portable Wi-Fi digital video camcorder 100. Therefore, the wireless network device 200 may include a storage unit 230 electrically connected with the processing unit 220. The storage unit 230 stores the wireless AP profile, according to which the wireless network device 200 builds connection with the wireless AP 300. The storage unit 230 may be a hard disk, a flash disk, a hybrid disk or other types of storage unit, which can store data. Therefore, the storage location may be directed to the storage unit 230, and the profile obtaining module 132 may obtain the wireless AP profile from the storage unit 230 according to the storage location. Wherein, the processing unit 220 of the wireless network device 200 may include a location obtaining module 224 to obtain the storage location of the wireless AP profile stored in the storage unit 230. Hence, the location transmitting module 221 can transmit the obtained storage location to the portable Wi-Fi digital video camcorder 100. Therefore, the portable Wi-Fi digital video camcorder 100 may build connection with the wireless AP 300 according to the wireless AP profile utilized by the wireless network device 200.

In addition, the portable Wi-Fi digital video camcorder 100 may obtain the wireless AP profile from a hot-plug bus. Therefore, the portable Wi-Fi digital video camcorder 100 may include a hot-plug bus 140 electrically connected with the processing unit 130. The hot-plug bus 140 may be Universal Serial Bus (USB), IEEE1394 or any other hot-plug bus. In one embodiment, the wireless network device 200 may include a hot-plug bus electrically connected with the processing unit 220. Then, the hot-plug bus 140 of the portable Wi-Fi digital video camcorder 100 can be connected with the hot-plug bus 280 of the wireless network device 200, and the wireless AP profile may be transmitted through the hot-plug bus 280 to the hot-plug bus 140. Wherein, the storage location can be directed to the hot-plug bus 140 to make the profile obtaining module 132 obtain the wireless AP profile through the hot-plug bus 140.

Figure 2:
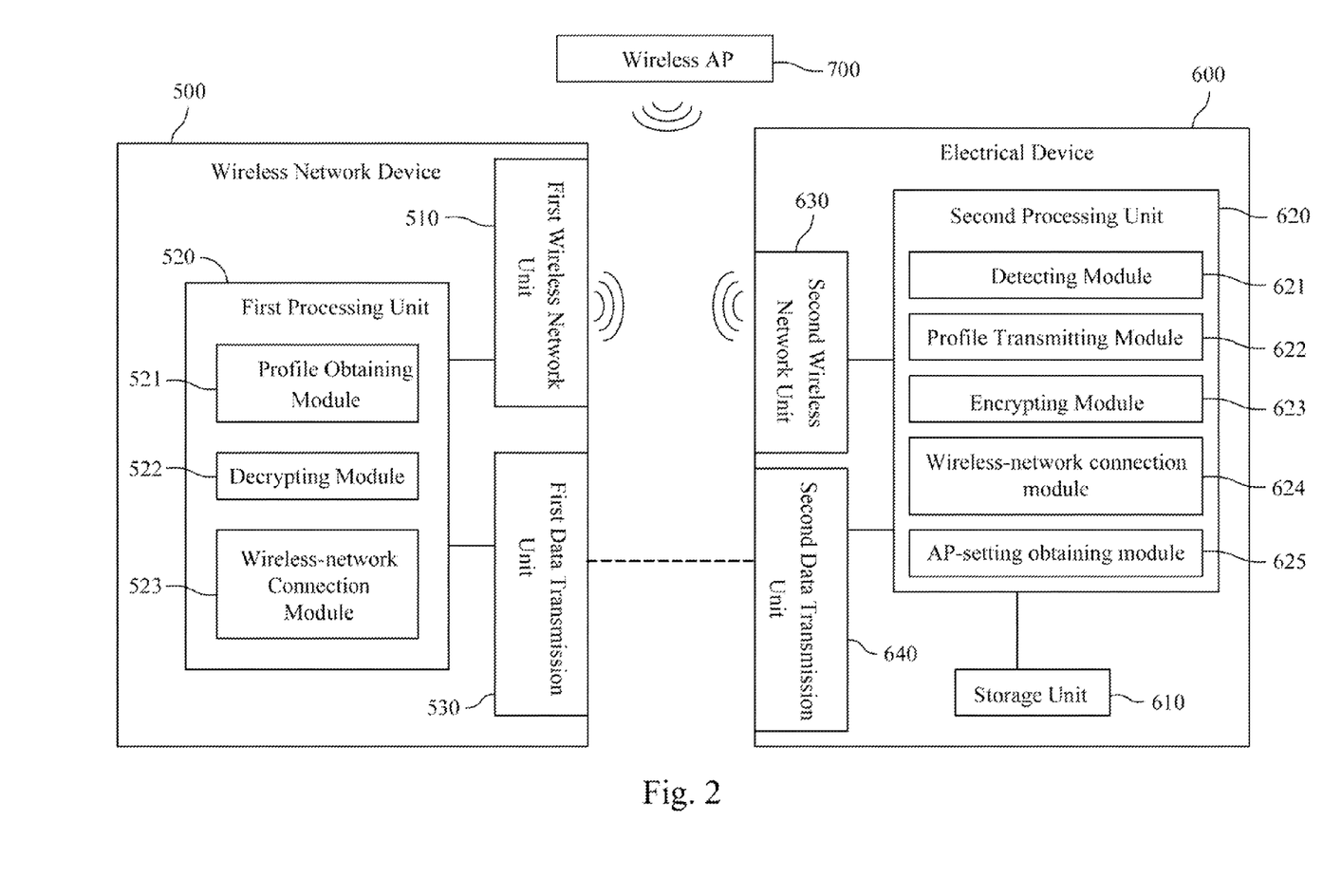
FIG. 2 illustrates a system with a wireless network device according to another embodiment of this invention.

In another system with a wireless network device, the wireless network device can obtain the profile for wireless data transmission by executing similar operations as described above. FIG. 2 illustrates a system with a wireless network device according to another embodiment of this invention. In the system, when a wireless network device is connected to an electrical device through a data transmission interface, the electrical device transmits the network profile thereof that is stored in the electrical device to the wireless network device, and the wireless network device transmits data wirelessly according to the received network profile.

The system includes a wireless network device 500 and an electrical device 600. The wireless network device 500 includes a first wireless network unit 510, a first processing unit 520 and a first data transmission unit 530. The first processing unit 520 is electrically connected to the first wireless network unit 510 and the first data transmission unit 530. The electrical device 600 includes a storage unit 610, a second processing unit 620 and a second data transmission unit 640. The second processing unit 620 is electrically connected to the storage unit 610 and the second data transmission unit 640. The first data transmission unit 530 and the second data transmission unit 640 can utilize USB®, IEEE 1394 or any other hot-plug interface or wired data transmission interface to transmit data.

The storage unit 610 stores a wireless network profile. The second processing unit 620 includes a detecting module 621 and a profile transmitting module 622. The detecting module 621 detects if the first data transmission unit 530 of the wireless network device 500 is connected to the second data transmission unit 640 of the electrical device 600. When connection of the wireless network device 500 is detected, the profile transmitting module 622 transmits the wireless network profile stored in the storage unit 610 through the second data transmission unit 640 to the first data transmission unit 530 of the wireless network device 500. When the profile obtaining module 521 of the first processing unit 520 obtains the wireless network profile through the first data transmission unit 530, a wireless-network connection module 523 of the first processing unit 520 drives the first wireless network unit 510 to transmit data wirelessly according to the wireless network profile.

Therefore, it is easy for users to connect the first data transmission unit 530 of the wireless network device 500 to the second data transmission unit 640 of the electrical device 600 to enable the wireless network device 500 to transmit data wirelessly without undergoing a complicated set-up process. In addition, since the wireless network profile is transmitted between the first data transmission unit 530 and the second data transmission unit 640 with a wire and not wirelessly, the wireless network profile is not easily stolen. If someone desires to steal the wireless network profile through the wired connection, it is easy to become aware of any such attempts to do so.

In one embodiment of this invention, the wireless network profile may include a wireless AP connection setting for connecting to a wireless AP. Hence, the system may further include a wireless access point (AP) 700. Subsequently, the first processing unit 520 can drive the first wireless network unit 510 to establish a connection with the wireless AP 700 for transmitting data wirelessly through a wireless network communication interface according to the wireless AP connection setting of the wireless network profile. In some embodiments, the wireless network communication interface utilized by the first wireless network unit 510 is Wi-FP or any other wireless network communication interface. Subsequently, the wireless network unit 510 of the wireless network device 500 can connect to the Internet through the connected wireless AP 700.

In another embodiment of this invention, the electrical device 600 may be equipped with a wireless network function, such that the wireless network device 500 can establish a wireless connection to the electrical device 600. Hence, the electrical device 600 may further include a second wireless network unit 630, and the wireless network profile may include a setting for connecting to the second wireless network unit 630 of the electrical device 600. Subsequently, the first processing unit 520 may drive the first wireless network unit 510 to establish a connection with the second wireless network unit 630 for transmitting data wirelessly through a wireless network communication interface according to the setting for connecting to the second wireless network unit 630. In some embodiments, the wireless network communication interface is an Ad-hoc network interface or any other wireless network communication interface. Subsequently, the wireless network device 500 may communicate data wirelessly with the electrical device 600. In addition, if the electrical device 600 can connect to the Internet, the wireless network device 500 can also connect to the Internet through the electrical device 600.

The second processing unit 620 of the electrical device 600 may further include an encrypting module 623, and the first processing unit 520 of the wireless network device 500 may further include a decrypting module 522. The encrypting module 623 may encrypt the wireless network profile and provide the resulting encrypted wireless network profile to the profile transmitting module 622 for transmission. The decrypting module 520 decrypts the encrypted wireless network profile, such that the first processing unit 520 can drive the first wireless network unit 510 to transmit data wirelessly according to the decrypted wireless network profile. Therefore, the system can be applied to an OS (Operating System), which may encrypt or decrypt profiles before transmission utilizing encryption and decryption functions. Such an OS may include Windows Vista®, Windows 7® or any other OS.

The electrical device 600 may prepare the wireless network profile. Hence, the second processing unit 620 of the electrical device 600 may include a wireless-network connection module 624 and an AP-setting obtaining module 625. The wireless network connection module 624 may establish a connection to a wireless network. The AP-setting obtaining module 625 obtains the wireless network profile for connecting to the wireless network. The second processing unit 620 may determine if the wireless network profile is encrypted by the OS of the electrical device 600. When it is determined that the wireless network profile is encrypted by the OS, the second processing unit 620 decrypts the wireless network profile with a key of the OS, and drives the second data transmission unit 640 to transmit the resulting decrypted wireless network profile to the wireless network device 500. Therefore, it is possible to avoid the situation in which the transmitted wireless network profile is encrypted by the OS of the electrical device 600, which would render the wireless network profile unusable by the wireless network device 500 as the basis for wireless data transmission. Hence, one embodiment of this invention can be suitable for an OS which may encrypt stored files. Such an OS may include Windows Vista®, Windows 7® or any other OS.

Besides, referring back to FIG. 1, users can control the portable Wi-Fi digital video camcorder 100 through the wireless network device 200. Therefore, the processing unit 130 of the portable Wi-Fi digital video camcorder 100 may include a control module 135, the wireless network device 200 may include an input unit 240, and the processing unit 220 of the wireless network device 200 may include a remote control module 222. The input unit 240 may be a mouse, a keyboard, a touch panel or any other input unit. The remote control module 222 receives a control instruction, which is used to control the portable Wi-Fi digital video camcorder 100, through the input unit 240, and utilizes the wireless network unit 210 to transmit the control instruction to the portable Wi-Fi digital video camcorder 100. The control module 135 controls the portable Wi-Fi digital video camcorder 100 according to the control instruction, which is received utilizing the wireless network unit 110. Therefore, users can control the portable Wi-Fi digital video camcorder 100 through the wireless network device 200 remotely.

The present video stream captured by the portable Wi-Fi digital video camcorder 100 can be displayed on the wireless network device 200. Therefore, the wireless network device 200 may include a display unit 250 electrically connected with the processing unit 220. When the wireless network unit 210 of the wireless network device 200 receives the present video stream captured by the portable Wi-Fi digital video camcorder 100, the processing unit 220 drives the display unit 250 to display the received present video stream. Therefore, the present video stream captured by the portable Wi-Fi digital video camcorder 100 can be displayed on another device through wireless network.

The portable Wi-Fi digital video camcorder 100 may display remote video stream as well. Therefore, the processing unit 130 may include a remote video stream processing module. The remote video stream processing module receives a remote video stream utilizing the wireless network unit 110 and makes the LCD driving module 136 drive the LCD unit 150 to display the remote video stream.

Besides, a video conferencing may be held utilizing the wireless network device 200 and the portable Wi-Fi digital video camcorder 100. Therefore, the wireless network device 200 may include an Internet accessing unit 260, and the processing unit 220 may include an instant message (IM) module 223. The Internet accessing unit 260 is electrically connected with the processing unit 220 and access Internet 400. Wherein, the Internet accessing unit 260 may be a wired network unit, a wireless network unit or any other component accessing Internet 400. The IM module 223 utilizes an IM application to transmit the present video stream captured by the portable Wi-Fi digital video camcorder 100, receives a remote video stream and drives the display unit 250 to display the remote video stream through Internet 400 with the Internet accessing unit 260. Therefore, users can utilize the wireless network device 200 and the portable Wi-Fi digital video camcorder 100 for video conferencing.

The portable Wi-Fi digital video camcorder 100 may capture an audio stream and transmit the captured audio stream through wireless network. Therefore, the portable Wi-Fi digital video camcorder 100 may include an audio capturing unit 160. The audio capturing unit 160 captures a present audio stream. The processing unit 130 utilizes the wireless network unit 110 to transmit the present audio stream. Wherein, the audio capturing unit 160 may be a microphone or any other component to capture audio stream.

Figure 3:
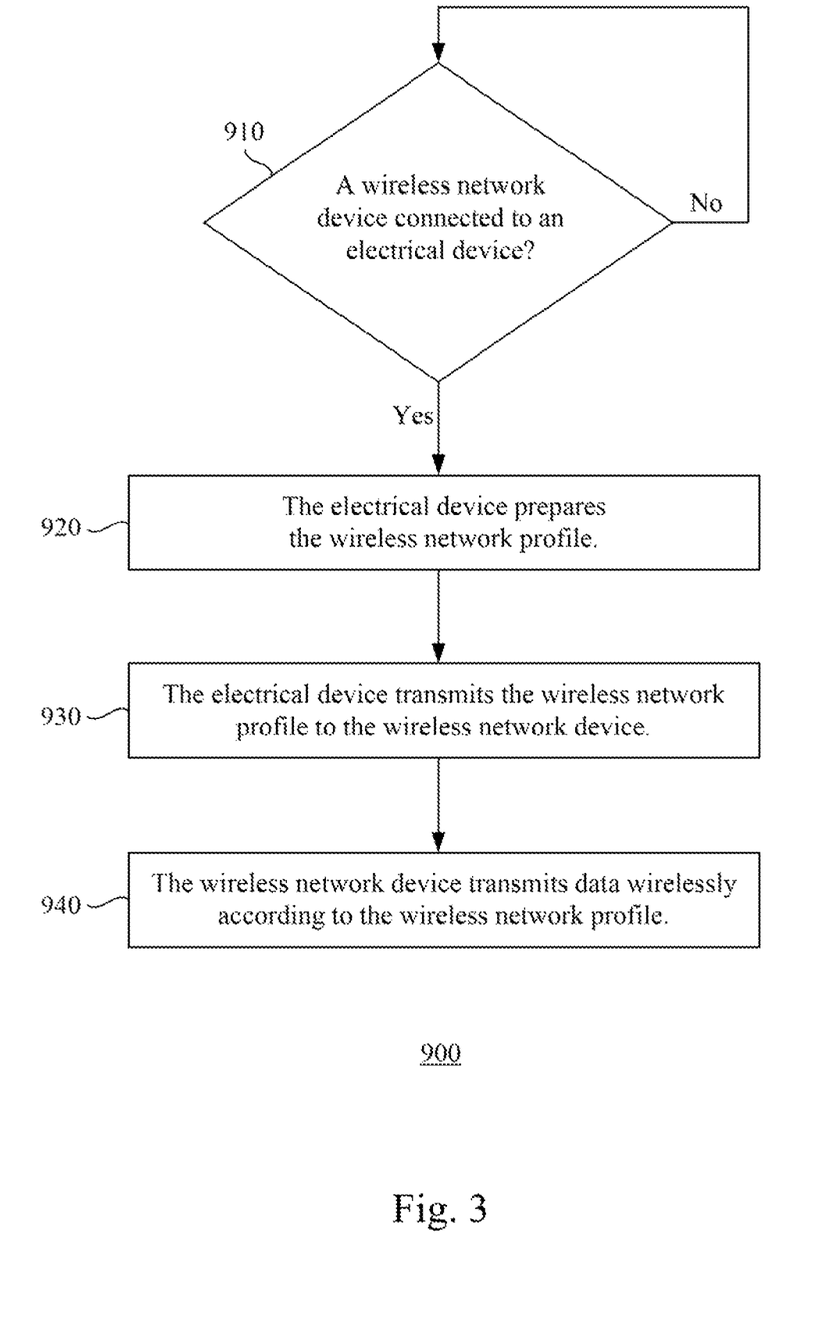
FIG. 3 illustrates a flow diagram of a method for processing a wireless network profile according to another embodiment of this invention.

FIG. 3 illustrates a flow diagram of a method for processing a wireless network profile according to another embodiment of this invention. In the method, when a wireless network device is connected to an electrical device through a data transmission interface, the electrical device transmits the network profile thereof that is stored in the electrical device to the wireless network device, and the wireless network device transmits data wirelessly according to the received network profile. The method may take the form of a computer program product stored on a computer-readable storage medium having computer-readable instructions embodied in the medium, such that a computer executes the method thereof after reading the computer-readable storage medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives and floppy disk drives.

The routine 900 begins at operation 910, where detection is performed to determine if there is a wireless network device connected to an electrical device through a data transmission interface. A wireless network profile is stored in the electrical device. The data transmission interface may be USB®, IEEE 1394 or any other hot-plug interface or wired data transmission interface.

When there is no wireless network device detected, the routine 900 returns back to operation 910 for another detection.

When the wireless network device is connected to the electrical device through the data transmission interface, the routine 900 continues to operation 930, where the electrical device transmits the wireless network profile to the detected wireless network device.

From operation 930, the routine 900 continues to operation 940, where the wireless network device transmits data wirelessly according to the wireless network profile. Therefore, it is easy for users to connect the wireless network device to the electrical device to enable the wireless network device to transmit data wirelessly without undergoing a complicated set-up process. In addition, since the wireless network profile is transmitted with a wire and not wirelessly, the wireless network profile is not easily stolen. If someone desires to steal the wireless network profile through the wired connection, it is easy to become aware of any such attempts to do so.

In one embodiment of this invention, the wireless network profile may include a wireless AP connection setting for connecting to a wireless AP. Hence, the operation in which the wireless network device transmits data wirelessly according to the wireless network profile (operation 940) may include the wireless network device establishing a connection with the wireless AP for transmitting data wirelessly through a wireless network communication interface according to the wireless AP connection setting of the wireless network profile. In some embodiments, the wireless network communication interface utilized by the wireless network device is Wi-Fi® or any other wireless network communication interface. Subsequently, the wireless network device can connect to the Internet through the connected wireless AP.

In another embodiment of this invention, the electrical device may be equipped with a wireless network function, such that the wireless network device can establish a wireless connection to the electrical device. Hence, the electrical device may include a wireless network unit, and the wireless network profile may include a setting for connecting to the wireless network unit of the electrical device. The operation in which the wireless network device transmits data wirelessly according to the wireless network profile (operation 940) may include the wireless network device establishing a connection with the wireless network unit of the electrical device for transmitting data wirelessly through a wireless network communication interface according to the setting for connecting to the wireless network unit. In some embodiments, the wireless network communication interface is an Ad-hoc network interface or any other wireless network communication interface. Subsequently, the wireless network device may transmit data wirelessly with the electrical device. In addition, if the electrical device can connect to the Internet, the wireless network device can also connect to the Internet through the electrical device.

The routine 900 may include encrypting or decrypting the network profile. Hence, the routine 900 may further include the electrical device encrypting the wireless network profile for transmitting the encrypted wireless network profile to the wireless network device at operation 930. The wireless network device then decrypts the encrypted wireless network profile, such that the wireless network device can transmit data wirelessly according to the decrypted wireless network profile at operation 940. Therefore, the routine 900 can be applied to an OS which may encrypt or decrypt profiles before transmission utilizing encryption and decryption functions. Such an OS may include Windows Vista®, Windows 7® or any other OS.

Figure 4:
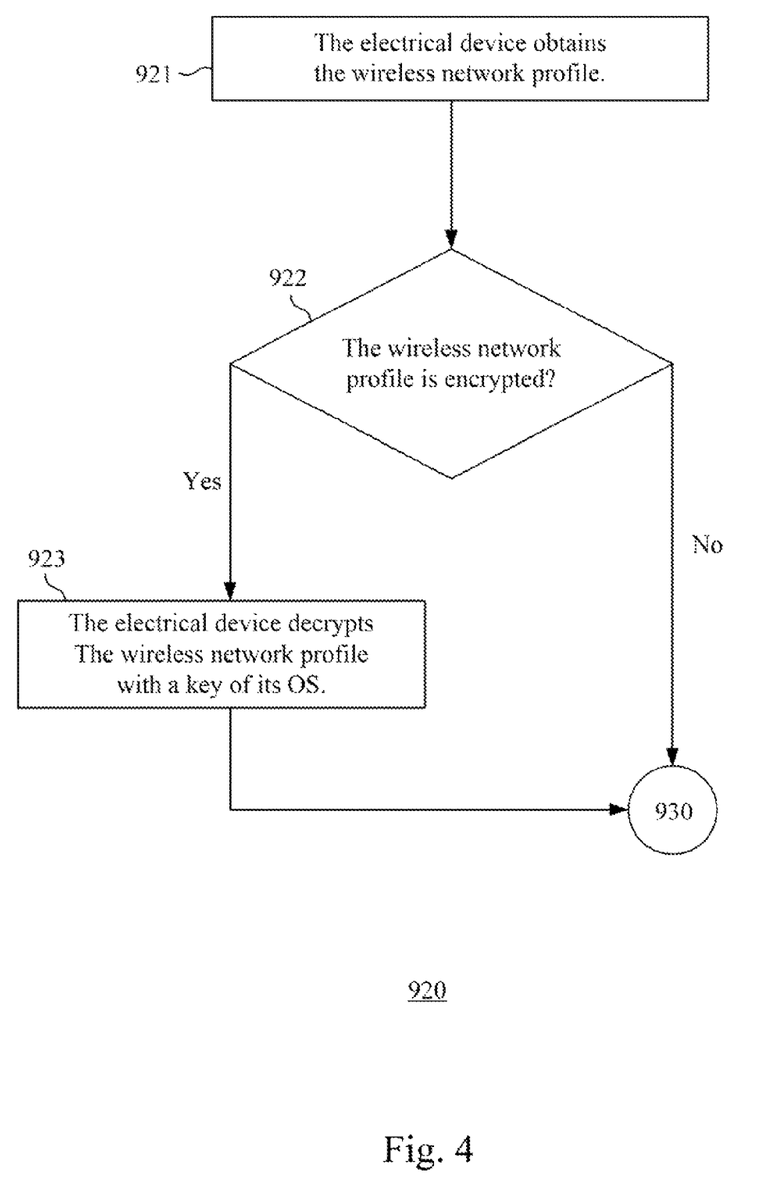
FIG. 4 illustrates a flow diagram of a method involving an electrical device preparing a network profile, in which the method is a routine associated with operation 920 of FIG. 3.

Before the operation in which the electrical device transmits the wireless network profile to the detected wireless network device (operation 930), the electrical device may prepare the network profile at operation 920. FIG. 4 is a flow diagram of a method involving the electrical device preparing the network profile, in which the method is a routine associated with operation 920 of FIG. 3.

The routine of operation 920 may begin at operation 921, where the electrical device obtains the wireless network profile.

From operation 921, the routine of operation 920 continues to operation 922, where a determination is made as to whether the wireless network profile is encrypted by an OS of the electrical device.

When the wireless network profile is not encrypted, the routine of operation 920 continues to operation 930, where the wireless network profile is transmitted to the detected wireless network device.

When the wireless network profile is encrypted by the OS, the routine of operation 920 branches to operation 923, where the electrical device decrypts the wireless network profile with a key of the OS. Subsequently, the routine of operation 920 continues to operation 930, where the electrical device transmits the decrypted wireless network profile to the wireless network device. Therefore, it is possible to avoid the situation in which the transmitted wireless network profile is encrypted by the OS of the electrical device, which would render the wireless network profile unusable by the wireless network device as the basis for wireless data transmission. Hence, one embodiment of this invention can be suitable for an OS which may encrypt stored files. Such an OS may include Windows Vista®, Windows 7® or any other OS.

Above all, a portable Wi-Fi digital video camcorder can transmit captured video stream through wireless network. In addition, a wireless network device can receive the video stream captured by the portable Wi-Fi digital video camcorder directly from the portable Wi-Fi digital video camcorder or through a wireless AP. Besides, a wireless AP profile, according to which the portable Wi-Fi digital video camcorder builds connection with a wireless AP, can be obtained from an assigned storage location. Therefore, users don't need to input the wireless AP profile for the portable Wi-Fi digital video camcorder, which is complicated and annoyed for users. Since the portable Wi-Fi digital video camcorder may transmit a present captured video stream and display a remote video stream, the portable Wi-Fi digital video camcorder can be utilized to interact with others, such as holding a video conferencing. Besides, the portable Wi-Fi digital video camcorder can be controlled remotely. In addition, a battery supplies power to the portable Wi-Fi digital video camcorder, and data is transmitted through Wi-Fi network. Therefore, users can carry the portable Wi-Fi digital video camcorder easily. Furthermore, it is easy for users to connect the wireless network device to the electrical device to enable the wireless network device able to transmit data wirelessly without undergoing a complicated set-up process. In addition, since the wireless network profile is transmitted with a wire and not wirelessly, the wireless network profile is not easily stolen. If someone desires to steal the wireless network profile through the wired connection, it is easy to become aware of any such attempts to do so.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A system with a wireless network device comprising:
    a wireless network device comprising:
        a first data transmission unit;
        a first wireless network unit; and
        a first processing unit electrically connected to the first data transmission unit and the first wireless network unit, wherein the first processing unit comprises a profile obtaining module;
    an electrical device comprising:
        a second data transmission unit, wherein the first data transmission unit and the second data transmission unit utilize a wired data transmission interface to transmit data;
        a storage unit for storing a wireless network profile; and
        a second processing unit electrically connected to the second data transmission unit and the storage unit, wherein the second processing unit comprises:
            a detecting module for detecting if the first data transmission unit of the wireless network device is connected to the second data transmission unit of the electrical device through the wired data transmission interface; and
            a profile transmitting module for transmitting the wireless network profile stored in the electrical device through the second data transmission unit to the first data transmission unit of the wireless network device when it is detected that the first data transmission unit of the wireless network device is connected to the second data transmission unit of the electrical device through the wired data transmission interface; and
    a wireless access point (AP) which is separate from and external to each of the wireless network device and the electrical device, the wireless network device being separate from and external to the electrical device,
    wherein the first processing unit drives the first wireless network unit to transmit data wirelessly according to the wireless network profile when the profile obtaining module obtains the wireless network profile through the first data transmission unit
    wherein the wireless network profile comprises a wireless AP connection setting for connecting to the wireless AP,
    wherein the first processing unit drives the first wireless network unit to establish a direct connection with the wireless AP for transmitting data wirelessly through a wireless network communication interface according to the wireless AP connection setting of the wireless network profile.

2. The system of claim 1, wherein the wireless network communication interface is Wi-Fi®.

3. The system of claim 1, wherein the electrical device further comprises:
    a second wireless network unit, wherein the wireless network profile further comprises a setting for connecting to the second wireless network unit,
    wherein the first processing unit drives the first wireless network unit to establish a connection with the second wireless network unit for transmitting data wirelessly through a wireless network communication interface according to the setting for connecting to the second wireless network unit.

4. The system of claim 3, wherein the wireless network communication interface is an Ad-hoc network interface.

5. The system of claim 1, wherein
    the second processing unit further comprises an encrypting module for encrypting the wireless network profile and providing the encrypted wireless network profile to the profile transmitting module for transmission,
    the first processing unit further comprises a decrypting module for decrypting the encrypted wireless network profile, such that the first processing unit drives the first wireless network unit to transmit data wirelessly according to the decrypted wireless network profile.

6. A method for processing a wireless network profile comprising:
    (a) detecting if a wireless network device is connected to an electrical device through a wired data transmission interface, wherein a wireless network profile is stored in the electrical device, and the wireless network profile comprises a wireless access point (AP) connection setting for connecting to a wireless AP which is separate from and external to each of the wireless network device and the electrical device, the wireless network device being separate from and external to the electrical device;
    (b) when it is detected that the wireless network device is connected to the electrical device through the wired data transmission interface, utilizing the electrical device to transmit the wireless network profile to the detected wireless network device; and
    (c) utilizing the wireless network device to transmit data wirelessly according to the wireless network profile, wherein the operation (c) comprises:
    utilizing the wireless network device to establish a direct connection with the wireless AP for transmitting data wirelessly through a wireless network communication interface according to the wireless AP connection setting of the wireless network profile.

7. The method of claim 6, wherein the wireless network communication interface is Wi-Fi®.

8. The method of claim 6, wherein the operation (c) further comprises:
    utilizing the wireless network device to establish a connection with a wireless network unit of the electrical device for transmitting data wirelessly through a wireless network communication interface according to a setting for connecting to the wireless network unit, which is included in the wireless network profile.

9. The method of claim 8, wherein the wireless network communication interface is an Ad-hoc network interface.

10. The method of claim 6 further comprising:
utilizing the electrical device to encrypt the wireless network profile and transmit the encrypted wireless network profile to the wireless network device; and
utilizing the wireless network device to decrypt the encrypted wireless network profile, such that the wireless network device transmits data wirelessly according to the decrypted wireless network profile.

11. The method of claim 6 further comprising:
utilizing the electrical device to obtain the wireless network profile;
before utilizing the electrical device to transmit the wireless network profile to the wireless network device, determining if the wireless network profile is encrypted by an OS of the electrical device; and
when the wireless network profile is encrypted by the OS, decrypting the wireless network profile with a key of the OS, and utilizing the electrical device to transmit the decrypted wireless network profile to the wireless network device.

* * * * *